(12) United States Patent
Baer et al.

(10) Patent No.: US 8,611,068 B2
(45) Date of Patent: Dec. 17, 2013

(54) MULTILAYER POLYMER DIALECTRIC FILM HAVING A CHARGE-DELOCALIZING INTERFACE

(75) Inventors: Eric Baer, Cleveland Heights, OH (US); Anne Hiltner, Cleveland, OH (US); James S. Shirk, Alexandria, VA (US); Mason A. Wolak, Alexandria, VA (US)

(73) Assignee: Case Western Reserve University, Cleveland, OH (US)

( * ) Notice: Subject to any disclaimer, the term of this patent is extended or adjusted under 35 U.S.C. 154(b) by 400 days.

(21) Appl. No.: 12/580,816

(22) Filed: Oct. 16, 2009

(65) Prior Publication Data
US 2010/0172066 A1 Jul. 8, 2010

Related U.S. Application Data

(60) Provisional application No. 61/106,017, filed on Oct. 16, 2008.

(51) Int. Cl.
*H01G 4/08* (2006.01)
*H01G 4/06* (2006.01)
*H01G 4/20* (2006.01)

(52) U.S. Cl.
USPC .......................... 361/323; 361/313

(58) Field of Classification Search
USPC ................................ 361/313, 323
See application file for complete search history.

(56) References Cited

U.S. PATENT DOCUMENTS

| | | | | |
|---|---|---|---|---|
| 3,348,995 A | * | 10/1967 | Baker et al. | 428/215 |
| 3,806,775 A | * | 4/1974 | Edman | 361/314 |
| 4,323,948 A | * | 4/1982 | Mercier et al. | 361/315 |
| 5,168,421 A | * | 12/1992 | Suzuki et al. | 361/323 |
| 5,636,100 A | * | 6/1997 | Zheng et al. | 361/312 |
| 5,759,467 A | * | 6/1998 | Carter et al. | 264/173.12 |
| 5,958,581 A | * | 9/1999 | Khanarian et al. | 428/357 |
| 6,187,028 B1 | * | 2/2001 | Munshi | 607/1 |
| 6,426,861 B1 | * | 7/2002 | Munshi | 361/312 |
| 6,594,134 B2 | * | 7/2003 | Yializis | 361/305 |
| 2003/0171465 A1 | * | 9/2003 | Kliesch et al. | 524/127 |
| 2006/0267459 A1 | * | 11/2006 | Shelby | 310/358 |
| 2007/0108490 A1 | * | 5/2007 | Tan et al. | 257/296 |
| 2009/0226711 A1 | * | 9/2009 | Silvi et al. | 428/331 |
| 2010/0067172 A1 | * | 3/2010 | Zhang et al. | 361/323 |
| 2010/0226065 A1 | * | 9/2010 | Fujii et al. | 361/275.4 |
| 2011/0110015 A1 | * | 5/2011 | Zhang et al. | 361/311 |

OTHER PUBLICATIONS

Jin et al., New Class of Bioinspired Lenses with a Gradient Refractive Index, Nov. 8, 2006, Journal of Applied Polymer Science, vol. 103, pp. 1834-1841.*
Mueller et al., Microlayer Coextrusion: Processing and Applications, 1997, Polymer Process Engineering 97.*
Wolak et al., Dielectric response of structured multilayered polymer films fabricated by forced assembly, Mar. 17, 2008, Applied Physics Letters 92, 113301.*

* cited by examiner

*Primary Examiner* — David M Sinclair
(74) *Attorney, Agent, or Firm* — Tarolli, Sundheim, Covell & Tummino LLP (57) ABSTRACT

A multilayer polymer dielectric film includes a coextruded first dielectric layer and second dielectric layer. The first dielectric includes a first polymer material and the second dielectric layer includes a second polymer material. The first dielectric layer and the second dielectric layer defining an interface between the layers that delocalizes charges in the layers.

25 Claims, 5 Drawing Sheets

MULTILAYER POLYMER DIALECTRIC FILM HAVING A CHARGE-DELOCALIZING INTERFACE

RELATED APPLICATION

This application claims priority from U.S. Provisional Application No. 61/106,017, filed Oct. 16, 2008, the subject matter, which is incorporated herein by reference.

GOVERNMENT FUNDING

This invention was made with government support under Grant No. CON500755 awarded by Office of Naval Research, and Grant No. CON500535, The National Science Foundation. The United States government may have certain rights to the invention.

TECHNICAL FIELD

The present invention relates to an extruded multilayer polymer dielectric film and, in particular, relates to the application of multilayer polymer dielectric film for film capacitors.

BACKGROUND OF THE INVENTION

Capacitors employ low temperature thermoplastic dielectric thin film polymers, such as polypropylene (PP), polyethylene terephthalate (PET), polycarbonate, polyethylene-2,6-naphthalate, polyvinylidene difluoride (PVDF), polyphenylene oxide, and polyphenylene sulfide, either metallized or maintained between metal foil electrodes. Metalized film capacitors are used extensively in a broad range of electrical and electronic equipment that include motor run and motor start circuits for air conditioners, fluorescent and high intensity light ballasts, power supplies, telecommunication equipment, instrumentation, and medical electronics. In many of these applications, the metallized capacitors are used to store energy.

SUMMARY OF THE INVENTION

The present invention related a multilayer polymer dielectric film that includes a co-extruded first dielectric layer and a second dielectric layer. The first dielectric layer includes a first polymer material and the second dielectric layer includes a second polymer material. The first layer and second layer define an interface that delocalizes charge build-up in the layers.

In an aspect of the invention, the first polymer material has a permittivity greater than the second polymer material. The second polymer material has a breakdown strength greater than the first polymer material.

The multilayer polymer dielectric film can be used in a new class of high energy dense dielectric materials useful for capacitor applications. The multilayer structure of the dielectric film can substantially increase the dielectric strength of the material over that of the component materials. Such layered polymers are effective at enhancing the energy storage ability of high dielectric constant capacitor materials. Further, the fine control over the details of the multilayer polymer dielectric film allows for modification and enhancement other dielectric properties, such as the dielectric permittivity, the energy storage capacity, the dielectric strength, and the polarization hysteresis of the materials.

The multilayer polymer dielectric film can include alternating first polymer layers and second polymer layers. The polymers used to form the first layers and the second layer can be selected based on their dielectric properties and insulating properties that act as a barrier to electrical breakdown. The multilayer polymer dielectric film can include at least two layers, e.g., the first polymer layer and the second polymer, as well as have tens to many hundreds or even thousands of layers with a controllable layer thickness, for example from microns to less than about 10 mm.

The multilayer dielectric films in accordance with the present invention can be readily fabricated by multilayer coextrusion forced assembly techniques. This technique can be devoid of solvent (i.e., solventless) and provide polymer films that can have from two layers up to tens to thousands of layers with a controllable layer thickness from, for example, microns to less than about 10 nm. The multilayer coextrusion forced assembly techniques are readily scaled to inexpensive volume production. The fabrication techniques can be readily scaled to produce films of dielectric polymer with lengths of thousands of feet and more.

In an aspect of the invention, the first layers and the second layers can have thicknesses of about 5 to about 5000 nm. With properly chosen first polymer materials and second polymer materials, the layer structure in the multilayer polymer dielectric film can have a high energy density and increased breakdown strength compared to component polymers or to conventional polymer dielectric films formed from polymers and/or polymer blends. When employed in a capacitor, the layers of multilayer polymer dielectric film are perpendicular to the electrical field maximizing the barrier to electrical breakdown propagation. Capacitors employing the multilayer polymer dielectric film can have a high breakdown strength and lower hysteresis compared to, for example, batteries.

In an example of the invention, the first polymer layer can be a copolymer of polyvinylidene fluoride (coPVDF) and the second polymer layer can be polycarbonate (PC). In one example, the multilayer polymer dielectric film included about 50% by weight polycarbonate and about 50% by weight coPVDF, had a maximum energy density of at least about 13 $J/cm^3$ and an electrical break down field of 750 kV/mm.

In a further aspect of the invention, at least one of the first polymer layers and the second polymer layers can include a filler to improve the dielectric properties of the first polymer material and/or the second polymer material. The filler can include, for example, titanium dioxide, barium titanate, and/or silica particles.

In a still further aspect of the invention, the multilayer polymer dielectric film can be axially oriented in a direction substantially perpendicular to thickness of the film and/or substantially parallel to a plane defined by a surface of the film after and/or during formation of film to improve the dielectric properties of the film.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
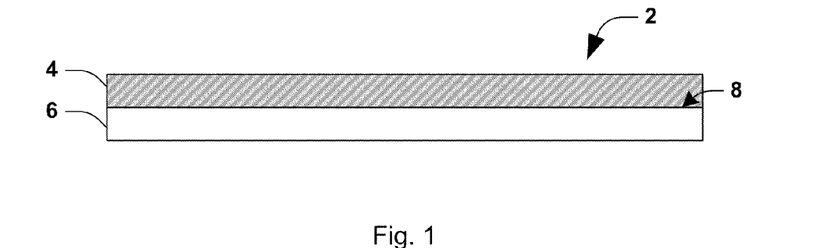
FIG. 1 is a schematic illustration of a multilayer polymer dielectric film in accordance with an aspect of the invention.

The present invention relates to a multilayer polymer dielectric film and to capacitors that include a multilayer polymer dielectric film (referred to as a multilayer film). Referring to FIG. 1, the multilayer polymer dielectric film 2 includes a co-extruded first dielectric layer 4 and a second dielectric layer 6. The first dielectric layer 4 includes a first polymer material and the second dielectric layer 6 includes a second polymer material. The first dielectric layer 4 and the second dielectric layer 6 define an interface 8 that delocalizes charge build-up in the layers.

The multilayer polymer dielectric film can include a plurality of alternating first dielectric layers and second dielectric layers that are stacked to form the multilayer polymer dielectric film. The polymer materials used to form the first dielectric layer and the second dielectric can include a polymer with desirable dielectric properties and a polymer with insulating properties that acts as a barrier to electrical breakdown. In one example, the first polymer material formed into the first dielectric layer can be chosen to have a high permittivity (e.g., greater than the permittivity of the second polymer material) but it need not have a high dielectric strength. The second polymer material formed in the second layer can be chosen to have a high breakdown strength (e.g., greater than the breakdown strength of the first polymer material). The first layers and the second layers can have various thicknesses, for example, about 5 to about 5000 nm that can be readily varied to adjust electric properties of the multilayer dielectric polymer film. When employed in a capacitor, the first layer(s) and second layer(s) are perpendicular to the electrical field thus maximizing the breakdown field or strength of the multilayer film by maximizing the barrier to electrical breakdown propagation presented by the second polymer material. Since the maximum stored energy density of dielectric materials is proportional to the effective permittivity times the square of the dielectric strength, the maximum stored energy density of the multilayer film can substantially exceed that of either of the component polymers in their pure state.

Figure 2:
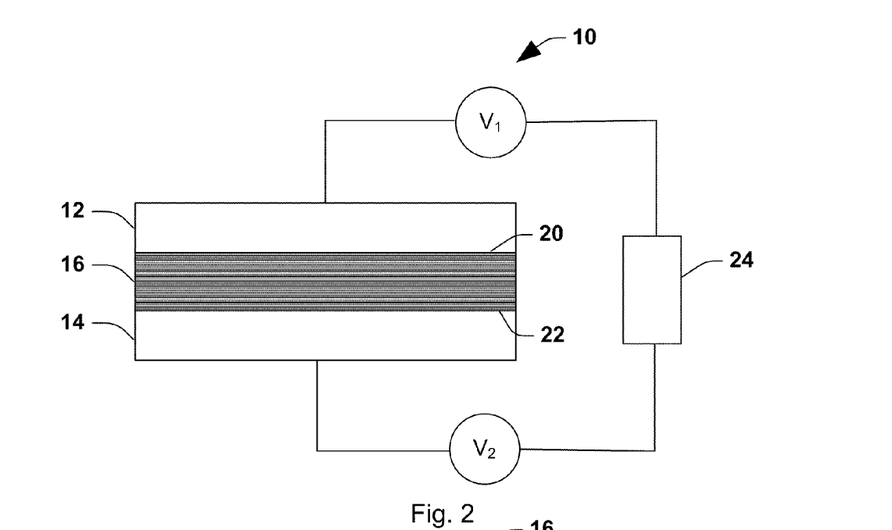
FIG. 2 is a schematic illustration of a capacitor in accordance with an embodiment of the present invention.

FIG. 2 illustrates a schematic view of a capacitor 10 in accordance with an aspect of the invention. The capacitor 10 includes a first electrode 12, a second electrode 14, and a multilayer polymer dielectric film 16. The multilayer polymer dielectric film 16 includes a first surface 20 and second surface 22 that is separated from and substantially parallel to the first surface 20. The multilayer polymer dielectric film is sandwiched between the first electrode 12 and the second electrode 14 such that the first electrode 12 is provided on and in contact with the first surface 20 and the second electrode 14 is provided on and in contact with the second surface 22. The first electrode 12 can be coupled to first power source, and the second electrode 14 can be coupled to a second power source 2. The first source $V_1$ and the second power source $V_2$ can be coupled to a voltage source 24 that is capable of applying varying bias voltages to the electrodes 12 and 14.

Figure 3:
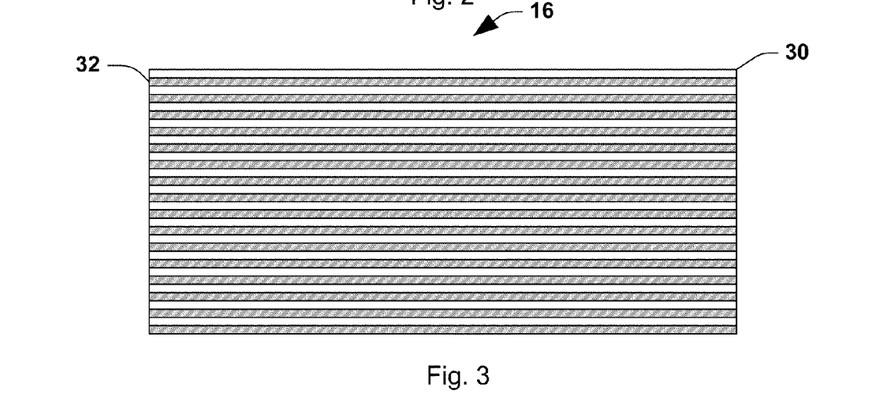
FIG. 3 is a schematic illustration of a multilayer polymer dielectric film of the capacitor of FIG. 2.
Figure 4:
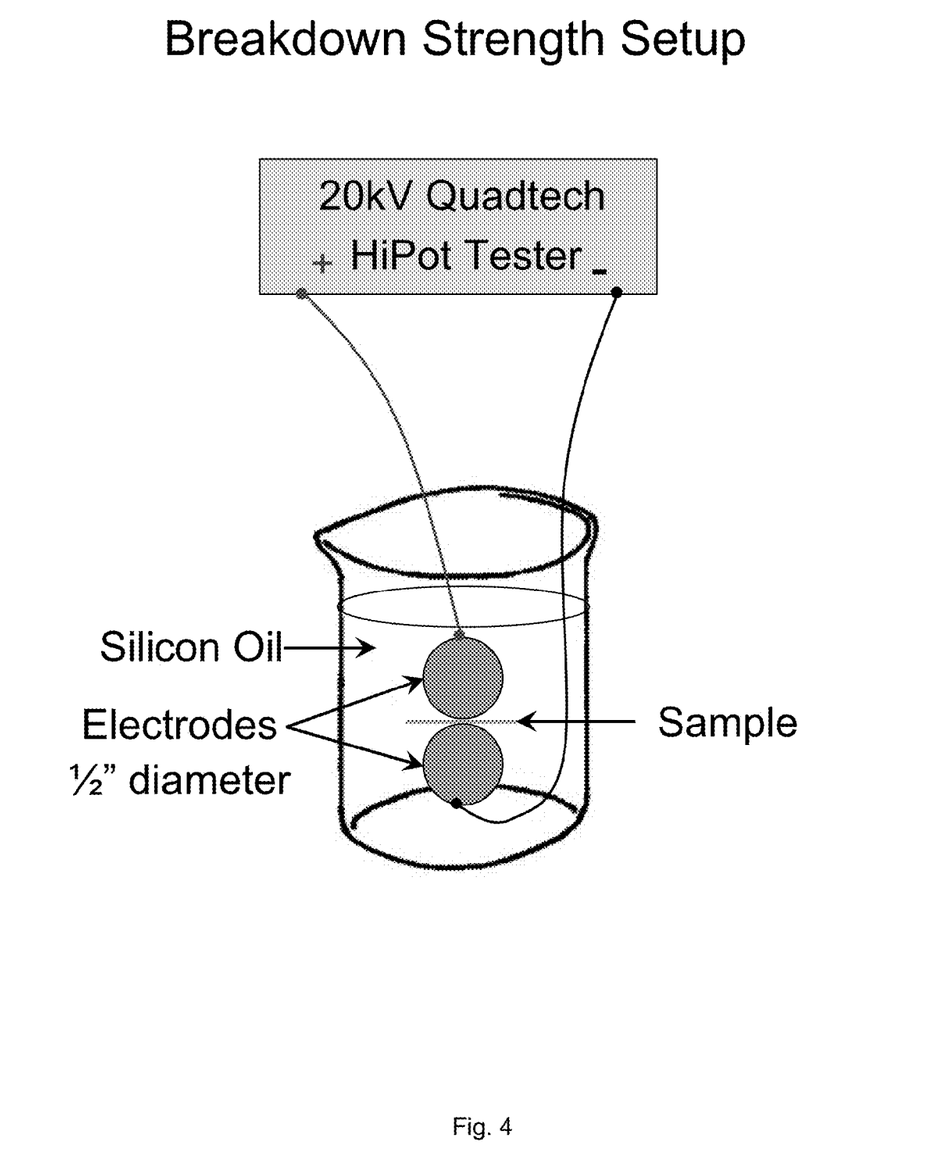
FIG. 4 is a schematic illustration of a device for measuring the breakdown strength of the multilayer polymer dielectric film.

Referring to FIG. 3, the multilayer polymer dielectric film 14 in accordance with an aspect of the invention can include a plurality of alternating first dielectric layers 30 and second dielectric layers 32 of, respectively, a first polymer material and a second polymer material. The first dielectric layers 30 and the second dielectric layers 32 can be substantially parallel and stacked so that each first layer 30 is adjacent to at least one of the second layers 32 and defines an interface between each layer. Each interface and/or the combination of interfaces can delocalize charge build up in the layers 30 and 32 and the multilayer film 14.

The first polymer material and the second polymer material can be selected so that the stored energy density and break down strength of the film 14 is maximized. In an aspect of the invention, the first polymer material can comprise a thermoplastic polymer, such as glassy, crystalline or elastomeric material, that has a high permittivity (e.g., permittivity greater than the second polymer material). The first polymer material can comprise a single polymer, a composite polymer material, or a blend of polymers. In an aspect of the invention, the stored energy density and the permittivity can be substantially greater than the stored energy density and permittivity of the second polymer material.

In another aspect, the second polymer material can comprise a thermoplastic, such as glassy, crystalline or elastomeric material, that has a high breakdown strength (e.g., breakdown strength higher than the first polymer material). The second polymer material can comprise a single polymer, a composite polymer material, or a blend of polymers. In one aspect of the invention, the breakdown strength of the second polymer material can be substantially greater than the breakdown strength of the first polymer material and this can give the multilayer film a higher maximum stored energy density and break down strength than either of the pure component polymers.

One of ordinary skill in the art will readily appreciate that a wide variety of thermoplastic polymeric materials can be used to form the first layers and second layers of the multilayer polymer dielectric film of the present invention. Such materials include, but are not limited to glassy polymers, crystalline polymers, and elastomers.

The term "polymer" or "polymeric material" as used in the present application denotes a material having a weight average molecular weight (Mw) of at least 5,000. Preferably, the polymer is an organic polymeric material. The term "oligomer" or "oligomeric material" as used in the present application denotes a material with a weight average molecular weight of from 1,000 to less than 5,000. Such polymeric materials can be glassy, crystalline or elastomeric polymeric materials.

Examples of polymeric materials that can be used to form the first dielectric layer and second dielectric layer of the multilayer polymer dielectric film include maleic anhydride-modified polypropylene (PPgMA); polyethylene naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers such as atactic, isotactic and syndiotactic polystyrene, α-methyl-polystyrene, para-methyl-polystyrene; polycarbonates such as bisphenol-A-polycarbonate (PC); poly (meth)acrylates such as poly(isobutyl methacrylate), poly(propyl methacrylate), poly(ethyl methacrylate), poly(methyl methacrylate), poly(butyl acrylate) and poly(methyl acrylate) (the term "(meth)acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly(4-methyl)pentene; fluorinated polymers, such as perfluoroalkoxy resins, polytetrafluoroethylene, fluorinated ethylene-propylene copolymers, polyvinylidene fluoride, and polychlorotrifluoroethylene and copolymers thereof; chlorinated polymers such as polydichlorostyrene, polyvinylidene chloride and polyvinylchloride; polysulfones; polyethersulfones; polyacrylonitrile; polyamides; polyvinylacetate; polyether-amides. The dielectric layers can also be formed from copolymers such as, styrene-acrylonitrile copolymer (SAN), for example, containing between 10 and 50 wt %, preferably between 20 and 40 wt %, acrylonitrile, styrene-ethylene copolymer; and poly(ethylene-1,4-cyclohexylenedimethylene terephthalate) (PETG). Additional polymeric materials include an acrylic rubber; isoprene (IR); isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); and urethane rubber. Additional polymeric materials include block or graft copolymers.

In addition, each individual layer can include blends of two or more of the above-described polymers or copolymers, preferably the components of the blend are substantially miscible.

In one example, the first dielectric layer(s) can be formed from a material that has a high permittivity, such as polyvinylidene fluoride (PVDF) or a copolymer thereof, such as poly(vinylidene fluoride-co-hexafluoropropylene) (P(VDF-HFP)) or composites thereof. The second dielectric layer(s) can be polypropylene (PP), polyethylene teraphthalate (PET), polycarbonate (PC), poly(p-phenylene sulfide), copolymers thereof, or composites thereof.

The multilayer polymer dielectric film can include, for example, about 1% to about 99% by weight of the first polymer material and about 1% to about 99% by weight of the second polymer material. The weight ratio or weight percent of the first polymer material to the second polymer material in the multilayer polymer dielectric film can be adjusted by altering the thicknesses of the first polymer layer and the second layer to tailor the dielectric and energy density properties of the film. In one example, the multilayer dielectric film can include about 50% polycarbonate (PC) and about 50% PVDF or a copolymer thereof. A multilayer polymer dielectric film comprising about 50% PC and about 50% PVDF has a maximum energy density of at least about 13 J/cm$^3$ and a dielectric strength of 750 kV/mm.

It will be understood, however, that a specific constituent or concentration of first polymer material and the second polymer material or any constituent in a multilayer polymer dielectric film according to the invention can be adjusted so as to tailor the properties of polymeric dielectrics for different applications. For an implantable defibrillator, for example, high energy density is required as well as high breakdown voltages. In that instance, it is necessary to maximize the PVDF content for the energy requirement and to balance it accordingly with PC to stabilize the poor electrical properties of PVDF. However, to obtain some desired property(ies) other than simply energy density, it may be necessary to reduce the concentration of PVDF.

Optionally, the first dielectric layer and/or the second dielectric layer can include one of more additives to improve the stored energy density, break down, and/or permittivity of the multilayer polymer dielectric film. For example, the first layer and/or the second layer can include metal oxide particles, such as titanium dioxide, barium titanate, and/or silica particles, to improve dielectric properties (i.e., discharge resistance, breakdown strength, and permittivity) of the host polymer.

The multilayer polymeric dielectric film includes at least two layers (i.e., the first dielectric layer and the second dielectric layer), for example, at least 10 layers alternating between the first dielectric layer and the second dielectric layer. The number of layers in the multilayered polymer dielectric film is preferably in the range of from about 2 to about 100,000 and more preferably from about 10 to about 10,000, including any increments within these ranges. The multilayer polymer dielectric film can include up to about 500,000 layers alternating between the first layer and the second layer.

The layers of the multilayered polymer dielectric composite film of the present invention can have thicknesses in the range of, for example, about 5 nanometers (nm) to about 1,000 micrometers (μm). The thicknesses of the first dielectric layer(s) and the second dielectric layer(s) are such that the final multilayered polymer dielectric film can have a hierarchical structure on the nanometer, the micrometer and the centimeter scale. The number of first layers and second layers employed in the multilayer polymer dielectric film as well as the thicknesses of each of the layer can be selected so that the energy density and breakdown strength of the film is maximized.

The multilayer dielectric film can also include other polymer layers besides the first layer(s) and the second layer(s). These other polymer layers can be interspersed with the first layers and the second layers to modify the stored energy density, breakdown, and permittivity. In one example, the first layer (A), the second layer (B), and the addition (i.e., third) layer can be alternated so that the multilayer polymer dielectric film has a three component structure of alternating layers (ABCABCABC . . . ) or (ABC)$_x$, where x is at least 5. It will be appreciated that the first layer, second layer, and third layer can be provided any number of different component layers such as (CACBCACBC . . . ).

In an aspect of the present invention, a two-component multilayer polymer dielectric film can be prepared by coextruding the first polymer material and the second polymer material and layering the first layers and the second layers in a hierarchical structure as described above and disclosed in U.S. Pat. No. 6,582,807, issued Jun. 24, 2003, to Baer et al, which is incorporated herein by reference in its entirety. Advantageous, the first polymer material and the second polymer material can be coextruded without the use of a solvent so that coextrusion process is substantially solventless.

A first surface and an opposite second surface of the multilayer polymer dielectric film so formed can be metalized with a first layer and a second layer of an appropriate metal, such as aluminum, to form the first electrode and the second electrode. The first metal layer and second metal layer can have thicknesses of about 5 nm to about 500 nm and be formed, for example, by conventional metallization techniques.

An aspect of the multilayering technique in accordance with the present invention is that it allows the use of miscible, immiscible or partially miscible polymers to achieve a large stored energy density and breakdown strength in the film. This allows the fabrication of films that have higher stored energy density and breakdown strength than commercial capacitor films, such as PP and PET.

In another aspect of the present invention, the dielectric properties of the multilayer polymer dielectric film can be varied mechanically by axially orienting (e.g., stretching), pressure, tension, compression or shear stresses or a combination of these stresses. As pointed out above, the composite can be fabricated so that one or both of the component polymers is an elastomer. It was found that axial orientation of the multilayer polymer dielectric film in at least one direction parallel to the surface of the film unexpectedly improved the breakdown strength of the film. In one example, the multilayer polymer dielectric film can be biaxially oriented by stretching the film in a plane that is substantially parallel to a surface of the film at a draw ratio effective to increase the breakdown strength of the film. The draw ratio of the biaxially oriented multilayer polymer dielectric film can be about 1:1 to about 5:5. It will be appreciated that although the film can be biaxially oriented by stretching the film in at least two directions, the film can also be stretched in a single direction (e.g., uniaxially oriented) or stretched in multiple directions (e.g., triaxially oriented).

A number of designs of the multilayer dielectric film material are possible with this invention simply by choosing the appropriate initial materials and tailoring the polymer material, number of layers of the polymer materials, and thicknesses of the layers. A representative example of two polymers that could be used to form the first dielectric layer and the second dielectric layer, respectively, are PVDF and PC. The specific percentages of the polymer and hence the thicknesses and number of layers will depend on the specific requirements of the film capacitor in each particular instance. The use of PVDF and PC in alternating first and second layers results in improvements in the electrical properties of the multilayer film, including an increase in the breakdown voltage and electrical conductivity of the multilayer compared to PVDF alone and/or PC alone. The result is a multilayer dielectric film with enhanced energy density, breakdown strength, and electrical stability over PVDF or PC homopolymer alone.

Such design principles are readily extended to other polymeric materials, such as polyester or polypropylene or any other dielectrics to tailor the dielectric properties desired for a particular application. Very thin metalized film capacitors designed in accordance with this multilayer technique enable achieving a device with stable dielectric constant and, hence, stable capacitance with voltage, improved insulation resistance and clearing or self-healing ability, lower leakage currents, and higher voltage breakdowns (compared, for example, with homopolymer PVDF), with the potential for unprecedented energy density from a bulk capacitor system. The markedly higher performance values (energy density, reliability, weight) is anticipated to be matched by markedly lower cost per unit of performance when volume manufacturing is employed. The methodology of the invention is well suited for the production of the implantable defibrillator, for example, and in many other high pulse power applications where energy density is afforded a premium.

The multilayer polymer dielectric film of the invention offers high dielectric constant, improved stability, improved dissipation factor, improved clearing ability, and high breakdown voltage. Although this film is particularly well suited for film capacitor applications, it is also useful in electrical cables, magnetic tapes, optical films for security and other purposes, piezoelectric sensors, and food packaging, to name a few other applications.

This invention is further illustrated by the following examples, which should not be construed as limiting. The contents of all references, patent applications, patents, and published patent applications cited throughout this application are hereby incorporated by reference.

EXAMPLES

Example 1

Multilayer polymer dielectric films comprising either 32 or 256 layer were prepared by coextruding nanolayered sheets of alternating polycarbonate (PC) (MAKROLON 2205, which is commercially available from Bayer Material Science) and poly(vinylidene fluoride-co-hexafluoropropylene) (P(VDF-HFP)) which is commercially available from Solvay Solexis as SOLEF 21508),). The films produced included 0/100, 10/90, 30/70, 50/50, 70/30, 90/10, or 100/0 of the PC and the P(VDF-HFP) respectively. The layer thickness of the 50/50 composition was 400 nm for the 32 layer film and 50 nm for the 256 layer film.

Figure 5:
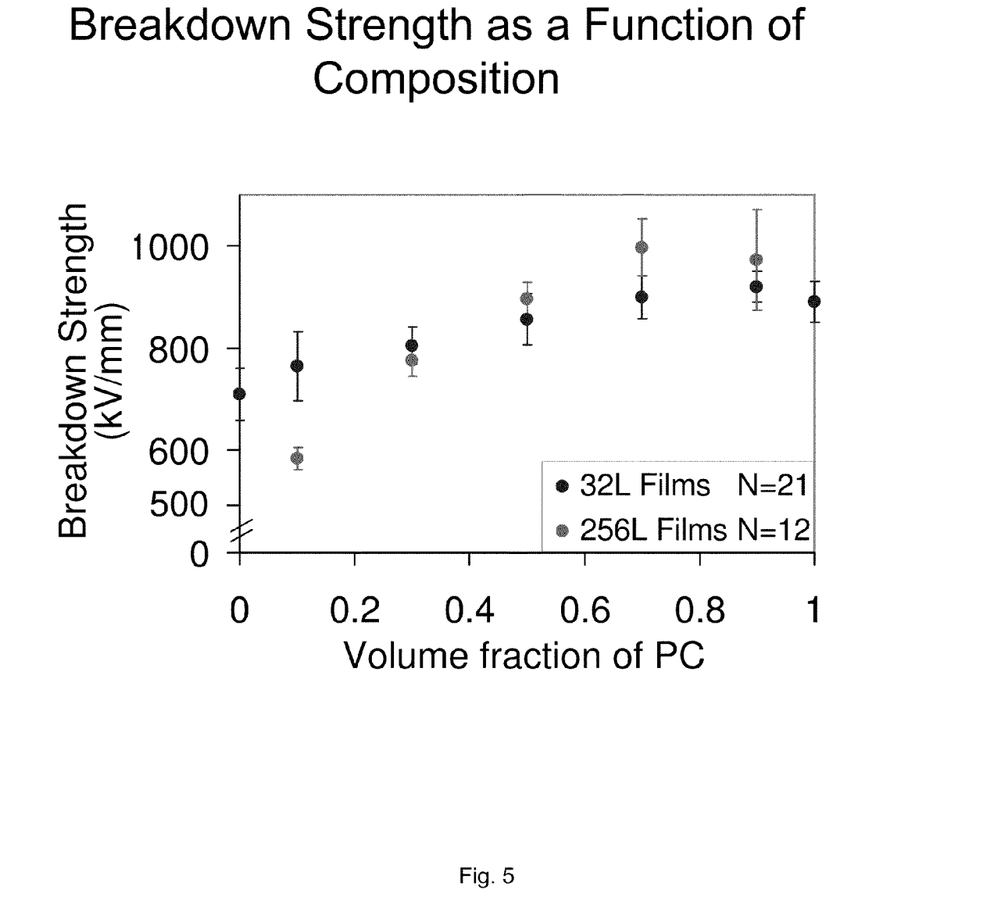
FIG. 5 illustrates plots of the measured breakdown strengths for different multilayer polymer dielectric film compositions.

The breakdown strength of each film was measured using a 20 kV quadtech HiPot tester with a 500V/S ramp as shown in FIG. 5. The breakdown strength in kV/mm for the various compositions of the 32 layer film and the 256 layer film was plotted as shown in FIG. 5. FIG. 5 shows that the 32 layer films and the 256 layer films each have an increased breakdown strength relative to pure single polymer controls. The highest breakdown strengths were observed in 70 PC/30 P(VDF-HFP) films.

Figure 6:
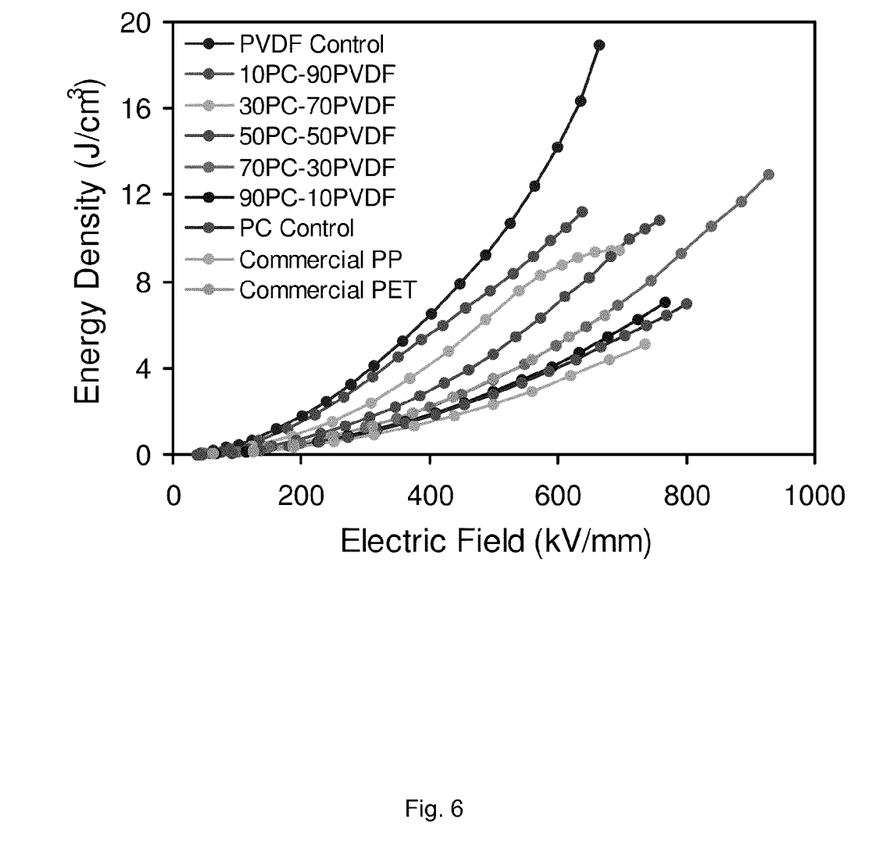
FIG. 6 illustrates plots of energy density vs. applied field for different multilayer polymer dielectric film compositions and includes data on current commercially available PP and PET films.

FIG. 6 illustrates plots the maximum energy density v. composition for various compositions of 256 layer films. The $U_d$ of the 50 PC/50 PVDF film is 13 J/cm$^3$, which is more than twice the energy density of PP and PET commercial capacitor films. The 50 PC/50 PVDF film also has a low tan δ (0.015) and low hysteresis.

As can be seen from the foregoing Figs., the 50 PC/50 PVDF film has the excellent properties for a high quality energy density capacitor.

Example 2

Multilayer polymer dielectric films comprising 32 layers were prepared by coextruding nanolayered sheets of polyethylene terephthalate (PET) and poly(vinylidene fluoride-co-tetrafluoroethylene) (P(VD-TFE). The films produced included 50/50, 70/30, 90/10, or 100/0 of the PET and the P(VDF-TFE) respectively. The layer thickness of the 50/50 composition was 400 nm for the 32 layer. The films comprising the various polymer ratios were biaxially stretched in a Bruckner Karo biaxial stretcher. The films were simultaneously and equi-biaxially drawn to draw ratios varying from 3:3 to 5:5.

Figure 7:
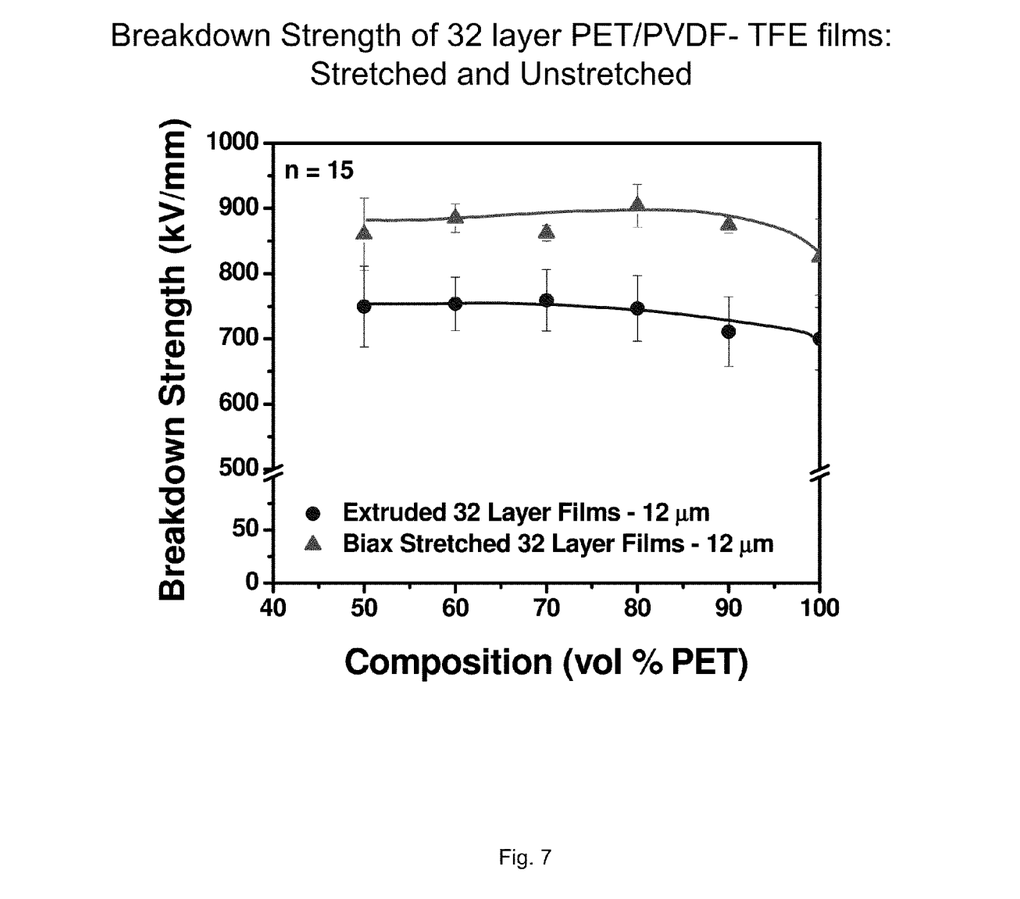
FIG. 7 illustrates plots of the measured breakdown strengths for stretched and unstretched multilayer polymer dielectric film compositions.

The breakdown strength of biaxially oriented films was measured using a 20 kV quadtech HiPot tester with a 500V/S ramp and compared with unstretched films having a similar composition. The breakdown strength in kV/mm for the various compositions of the 32 layer stretched and unstretched films were plotted as shown in FIG. 7. FIG. 7 shows that the 32 layer biaxially oriented films each have an increased breakdown strength relative to unstretched control films. The highest breakdown strengths were observed in the biaxially oriented 80 PET/20 P(VDF-TFE) films.

While a preferred embodiment of the invention has been illustrated and described, it shall be understood that the invention is not limited to this embodiment. Numerous modifications, changes and variations will be obvious for those skilled in the art, without departing from the scope of the invention as described by the appended claims. The multilayer polymer dielectric film is primarily intended to be used in film capacitors for devices, such as defibrillators, but it could be used anywhere where higher efficiency, faster charge time, and larger number of charge-discharge cycles are desired compared to conventional film capacitors and batteries.

All publications and patents mentioned in the above specification are herein incorporated by reference.

Having described the invention, the following is claimed:

1. A capacitor comprising a stack of coextruded, alternating first dielectric layers and second dielectric layers that receive and store electrical charge, the first dielectric layers comprising a first polymer material and the second dielectric layers comprising a second polymer material different from the first polymer material, the first polymer material having a permittivity greater than the second polymer material, and the second polymer material having a breakdown strength greater than the first polymer material, adjoining first dielectric layers and second dielectric layers defining an interface between the layers that delocalizes charge build-up in the layers.

2. The capacitor of claim 1, comprising about 4 to about 500,000 alternating first dielectric layers and second dielectric layers.

3. The capacitor of claim 1, wherein the first dielectric layers and second dielectric layers are fabricated by multilayer coextrusion forced assembly processes.

4. The capacitor of claim 1, the number of layers and the absolute and relative layer thickness of each layer being adjusted to vary the breakdown strength of the dielectric film.

5. The capacitor of claim 1, the first dielectric layers comprising PVDF, a copolymer thereof, or a composite thereof.

6. The capacitor of claim 5, the second dielectric layers comprising at least one of polypropylene (PP), polyethylene terephthalate (PET), polycarbonate (PC), poly(p-phenylene sulfide), copolymers thereof, or composites thereof.

7. The capacitor of claim 1 being axially oriented in at least one direction substantially parallel to a surface of the film at a ratio effective to increase the breakdown strength of the film.

8. The capacitor of claim 1, wherein at least one of the first polymer layers and the second polymer layers further comprises a filler to improve the dielectric properties of the first polymer material and/or the second polymer material.

9. The capacitor of claim 1, the first dielectric layers comprising at least one of poly(vinylidene fluoride-co-hexafluoropropylene) (P(VDF-HFP)) and poly(vinylidene fluouride-co-tetrafluoroethylene) (P(VD-TFE)).

10. The capacitor of claim 1, the stack of coextruded first dielectric layers and second dielectric layers having a breakdown voltage that is greater than the breakdown voltage of the first dielectric layers and the breakdown voltage of the second dielectric layers.

11. The capacitor of claim 1, the stack of coextruded first dielectric layers and second dielectric layers having an electrical conductivity that is greater than the electrical conductivity of the first dielectric layers and the electrical conductivity of the second dielectric layers.

12. The capacitor of claim 1, the stack of coextruded first dielectric layers and second dielectric layers having an energy density that is greater than the energy density of the first dielectric layers and the energy density of the second dielectric layers.

13. The capacitor of claim 1, the stack of coextruded first dielectric layers and second dielectric layers having a breakdown voltage, electrical conductivity, and energy density that is greater than the breakdown voltage, electrical conductivity, and energy density of the first dielectric layers and the breakdown voltage, electrical conductivity, and energy density of the second dielectric layers.

14. A capacitor comprising a multilayer polymer dielectric film, the film including a stack of coextruded, alternating first dielectric layers and second dielectric layers that receive and store electrical charge, the first dielectric layers comprising a first polymer material and the second dielectric layers comprising a second polymer material different from the first polymer material, the first polymer material having a permittivity greater than the second polymer material, and the second polymer material having a breakdown strength greater than the first polymer material, adjoining first dielectric layers and second dielectric layers defining an interface between the layers that delocalizes charge build-up in the layers.

15. The capacitor of claim 14, wherein the first dielectric layers and second dielectric layers are fabricated by multilayer coextrusion forced assembly processes.

16. The capacitor of claim 14, the first dielectric layers comprising PVDF, a copolymer thereof, or a composite thereof and the second dielectric layers comprising at least one of polypropylene (PP), polyethylene terephthalate (PET), polycarbonate (PC), poly(p-phenylene sulfide), copolymers thereof, or composites thereof.

17. The capacitor of claim 14, the multilayer polymer dielectric film being axially oriented in at least one direction substantially parallel to a surface of the film at a ratio effective to increase the breakdown strength of the film.

18. The capacitor of claim 14, wherein at least one of the first dielectric layers and the second dielectric layers further comprises a filler to improve the dielectric properties of the first polymer material and/or the second polymer material.

19. The capacitor of claim 14, further comprising a first metal film provided on a first surface of the multilayer polymer dielectric film and a second metal film provided on a second surface of the multilayer polymer dielectric film.

20. The capacitor of claim 14, the first dielectric layers comprising at least one of poly (vinylidene fluoride-co-hexafluoropropylene) (P(VDF-HFP)) and poly(vinylidene fluouride-co-tetrafluoroethylene) (P(VD-TFE)).

21. The capacitor of claim 14, the multilayer polymer dielectric film having a breakdown voltage that is greater than the breakdown voltage of the first dielectric layers and the breakdown voltage of the second dielectric layers.

22. The capacitor of claim 14, the multilayer polymer dielectric film having an electrical conductivity that is greater than the electrical conductivity of the first dielectric layers and the electrical conductivity of the second dielectric layers.

23. The capacitor of claim 14, the multilayer polymer dielectric film having an energy density that is greater than the energy density of the first dielectric layers and the energy density of the second dielectric layers.

24. The capacitor of claim 14, the multilayer polymer dielectric film having a breakdown voltage, electrical conductivity, and energy density that is greater than the breakdown voltage, electrical conductivity, and energy density of the first dielectric layers and the breakdown voltage, electrical conductivity, and energy density of the second dielectric layers.

25. A capacitor comprising:
first and second electrodes; and
a multilayer polymer dielectric film positioned between the first and second electrodes, the film including a stack of coextruded, alternating first dielectric layers and second dielectric layers that receive and store electrical charge, the first dielectric layers comprising a first polymer material and the second dielectric layers comprising a second polymer material different from the first polymer material, the first polymer material having a permittivity greater than the second polymer material, and the second polymer material having a breakdown strength greater than the first polymer material, adjoining first dielectric layers and second dielectric layers defining an interface between the layers that delocalizes charge build-up in the layers.

\* \* \* \* \*